(12) United States Patent
Richart (10) Patent No.: US 11,453,173 B2
(45) Date of Patent: Sep. 27, 2022

(54) SEALING PROCESS AND MACHINE (71) Applicant: SELENIUM MEDICAL, La Rochelle (FR)

(72) Inventor: Olivier Richart, Le Bois Plage en Ré (FR)

(73) Assignee: SELENIUM MEDICAL, La Rochelle (FR)

( * ) Notice: Subject to any disclaimer, the term of this patent is extended or adjusted under 35 U.S.C. 154(b) by 0 days.

(21) Appl. No.: 16/895,561

(22) Filed: Jun. 8, 2020

(65) Prior Publication Data

US 2020/0384697 A1 Dec. 10, 2020

Related U.S. Application Data

(60) Provisional application No. 62/859,371, filed on Jun. 10, 2019.

(51) Int. Cl.
*B29C 65/00* (2006.01)
*B29C 65/08* (2006.01)
*B29C 65/50* (2006.01)

(52) U.S. Cl.
CPC .............. *B29C 65/08* (2013.01); *B29C 65/50* (2013.01); *B29C 66/83411* (2013.01); *B29C 66/9221* (2013.01); *B29C 65/085* (2013.01)

(58) Field of Classification Search
CPC ............................. B29C 65/08; B29C 65/085
See application file for complete search history.

(56) References Cited

U.S. PATENT DOCUMENTS

| | | | | |
|---|---|---|---|---|
| 4,214,933 A | * | 7/1980 | Off | A41D 27/245 156/238 |
| 4,328,061 A | | 5/1982 | Off et al. | |
| 4,633,565 A | * | 1/1987 | DeWoskin | A41F 1/006 156/66 |
| 4,909,870 A | * | 3/1990 | Gould | A44B 19/16 156/66 |

(Continued)

FOREIGN PATENT DOCUMENTS

| | | |
|---|---|---|
| WO | 2013/057774 A1 | 4/2013 |
| WO | 2018/078242 A1 | 5/2018 |

OTHER PUBLICATIONS

French Search Report issued in French Application No. 1906151, dated Jan. 28, 2020, 6 pages.

*Primary Examiner* — Philip C Tucker
*Assistant Examiner* — Nickolas R Harm
(74) *Attorney, Agent, or Firm* — Brown Rudnick LLP; Thomas C. Meyers (57) ABSTRACT

The invention relates to a system and process of the sealing of an area of an object intended to be covered, such as an opening slot, by a sealing strip which becomes adhesive in an excited state when subjected to ultrasound. This procedure comprises the steps of: supplying a sealing strip between an object and a sonotrode having a linear application area; supporting or pressing the linear application area of the sonotrode with the sealing strip to thereby adhere the sealing strip area, which is in contact with the linear application area of the sonotrode, to a corresponding area of the object; and displacing the object in relation to the sonotrode according to a profile of the sealing area, so as to apply the sealing strip to the sealing area of the object.

11 Claims, 6 Drawing Sheets

(56) References Cited

U.S. PATENT DOCUMENTS

| | | | | |
|---|---|---|---|---|
| 5,660,666 | A * | 8/1997 | Dilnik | A61F 13/551 |
| | | | | 156/259 |
| 6,513,221 | B2 * | 2/2003 | Vogt | A61F 13/15756 |
| | | | | 156/200 |
| 10,543,943 | B2 * | 1/2020 | Yamamoto | B65B 43/465 |
| 2002/0071950 | A1 * | 6/2002 | Mitchell | B32B 27/08 |
| | | | | 428/343 |
| 2006/0216454 | A1 * | 9/2006 | Heil | B29C 66/83413 |
| | | | | 428/57 |
| 2012/0085479 | A1 * | 4/2012 | Goto | B65B 9/213 |
| | | | | 156/66 |
| 2012/0111475 | A1 * | 5/2012 | Ippers | B29C 66/1122 |
| | | | | 156/73.1 |
| 2013/0240153 | A1 * | 9/2013 | Hull | B29C 66/8322 |
| | | | | 156/580.2 |
| 2016/0016356 | A1 * | 1/2016 | Born | B29C 63/0026 |
| | | | | 156/73.1 |
| 2019/0001430 | A1 * | 1/2019 | Malchow | B29C 65/085 |

\* cited by examiner

SEALING PROCESS AND MACHINE

CROSS-REFERENCE TO RELATED APPLICATIONS

This application claims priority to, and the benefit of, U.S. Provisional Application No. 62/859,371, filed Jun. 10, 2019, and French Application No. FR 19 06151, filed Jun. 10, 2019, the contents of each of which are incorporated by reference herein in their entireties.

FIELD OF INVENTION

The present invention relates in general to the sealing of a part of an object, such as a part of a packaging, and, more particularly, to a sealing process and machine.

PRIOR ART

The application filed under PCT/FR2017/052853, and published under number WO2018078242A1, relates to a packaging comprising a lower shell and an upper shell. The upper shell has a lid and a connecting part in the form of a crossing body and is connected to the lid by a joint.

The free edge of the lid and the free upper edge of the crossing body delimit a peripheral slot that extends from one end of the joint to the opposite end of the joint. It is intended to apply a sealing strip that connects the edges of the lid and the connecting part facing each other along the length of said edges so as to cover the slot.

The connecting part is equipped with a stiffening element that allows the sealing strip to be applied to the slot without risking the deformation of the slot due to the rigidity conferred on the upper shell by the stiffening element.

Such a design of the top shell of the packaging thus allows the strip to be applied without risking the deformation of the slot, but it is also appropriate that the very process according to which the sealing strip is applied is reliable. Indeed, there may be a risk of the incorrect application of the sealing strip on the object, especially if the strip is applied with adhesion differences in certain places. It is thus desirable to develop a process and a corresponding machine that enables the reliable application of the sealing strip to obtain the desired sealing.

The invention of the present disclosure provides a new process and a new machine to remedy all or part of the problems described above.

SUMMARY OF THE INVENTION

The object of the present invention includes a process to seal an area of an object, known as a sealing area, such as an opening slot, with said sealing area being intended to be covered by a sealing strip, which is characterized in that, with the sealing strip comprising a material which is adhesive in the excited state by ultrasound, said process includes the following stages:
  feeding, using a rotating roller, the sealing strip between the object and a sonotrode with a linear application area;
  supporting or pressing the linear application area of the sonotrode with the sealing strip to thereby adhere the area of the sealing strip, which is in contact with the linear application area of the sonotrode, to a corresponding area of the object; and
  displacing the object in relation to the sonotrode, according to the profile of the sealing area, so as to apply the sealing strip to the sealing area of the object.

The sealing strip can thus be reliably applied at the level of the opening area of the packaging, with adhesion homogeneity between the strip and the object, which allows it to benefit from a good sealing at the level of the area on which the sealing strip is applied.

The process can also include one or more of the following characteristics used in any technically permissible combination.

According to an advantageous characteristic of the invention, the displacement of the object includes a rotation movement of the object around a rotation axis.

According to an advantageous characteristic of the invention, the displacement of the object includes a displacement of the object in a transverse direction to the direction of the rotation axis.

According to an advantageous characteristic of the invention, the displacement of the object comprises a displacement of the object in a parallel direction to the direction of the rotation axis.

According to an advantageous characteristic of the invention, ultrasound is transmitted by the sonotrode to the part of the sealing strip which is present between the object and the sonotrode, in such a way that said part of the sealing strip subjected to ultrasound is adhered to the object, and the displacement of the object causes the sealing strip to move between the sonotrode and the object.

According to an advantageous characteristic of the invention, the support or pressing effort or force of the sonotrode on the object is measured using a sensor, such as an effort or force gauge, and the object moves according to the measured support or pressing effort or force.

According to an advantageous characteristic of the invention, the direction of the line segment defined by the linear application area of the sonotrode is parallel to the rotation direction of the object.

According to an advantageous characteristic of the invention, the sealing strip includes a side with an adhesive, which becomes active when subjected to the ultrasound of the sonotrode.

According to an advantageous characteristic of the invention, the object is moved at least until the sealing strip goes back on itself by being adhered by the sonotrode on a part of the sealing strip already glued on the object.

According to an advantageous characteristic of the invention, the process includes a cutting step of the sealing strip after the sealing strip covered the sealing area of the object.

The invention also concerns a machine for sealing an area, known as a sealing area, of an object. The sealing area, such as an opening slot, is intended to be covered by a sealing strip provided with a material which is adhesive in the excited state by ultrasound, characterized in that said machine includes:
  a coupling system allowing holding the object;
  a sonotrode which has a linear application area suitable for coming into contact with the sealing strip, in the active state of the sonotrode, to adhere the sealing strip area which is in contact with the linear application area of the sonotrode, on the sealing area of the object;
  a feeding device, for example, by means of a rotating roller, to bring the sealing strip between the object and a sonotrode;
  a motorized displacement system for moving the object in relation to the sonotrode; and a controlling unit configured to control the motorized displacement system so as to move the object according to the profile of the sealing area to apply the sealing strip to the sealing area.

According to one particular aspect, the motorized displacement system is controlled in such a way as to keep the object supported, through the sealing strip, against the application area of the sonotrode.

According to an advantageous characteristic of the invention, the machine includes an effort sensor arranged to measure the support or pressing effort or force between the object and the sonotrode, and the controlling unit is configured to control the displacement of the object according to the measured support or pressing effort or force.

BRIEF DESCRIPTION OF THE DRAWINGS

Characteristics and advantages of the invention will also be highlighted in the following description, which is purely illustrative and non-limiting and which must be read in relation to the appended drawings, of which.

DETAILED DESCRIPTION

The inventive concept is described in more detail hereafter, with reference to the attached drawings, wherein embodiments of the inventive concept are shown. In the drawings, the sizes and relative sizes of the elements may be exaggerated to make them easier to see. Like numbers refer to like elements in all of the drawings. However, this inventive concept can be implemented in many different forms and should not be interpreted as being limited to the embodiments described herein. Rather, these embodiments are proposed in order to provide a complete description and convey the extent of the inventive concept to those skilled in the art.

Throughout the specification, reference to "an embodiment" means that any particular function, structure, or characteristic described in relation to an embodiment is included in at least one embodiment of the present invention. Thus, the appearance of the expression "in an embodiment" in various places throughout the specification does not necessarily refer to the same embodiment. Moreover, the particular functions, structures, or characteristics can be combined in any appropriate way in one or more embodiments.

In reference to the figures, a sealing machine has been represented, which includes an object coupling system configured to hold the object during a sealing operation. The coupling system includes a support 1 and a holding system to keep the object on sealing support 1.

In the example shown in the figures, sealing support 1 is supported by a device 10, referred to as a mandrel, which has rotation axis A1, and which is movable, for example, by a combination of carts, according to axes X and Z, which are orthogonal between each other and to axis A1. Axis Y of mark XYZ, shown in FIG. 1 through FIG. 6, corresponds to axis A1. Alternatively, the sealing support can be fitted on a multi-axis robot.

The holding system may be, for example, a suction system and suction ports 12 opening at the level of the part of the support intended to be engaged in the hollow part of the object. These suction means may include a depressurizing (or vacuum) device allowing, through ducts, to aspirate at the level of suction holes 12 housed in support 1 to generate a suction effect to maintain the plated or supported object against the support.

In the example shown in the figures, sealing support 1 has a male shape which is engaged in a hollow part of the object on which the sealing strip is intended to be applied.

Sealing support 1 is rotatably mounted around axis Y, and is displaceable in a plane X, Z, orthogonal to the axis Y. In particular, support 1 is movably mounted in a direction X and in a direction Z, orthogonal in relation to one another.

In the example shown in the figures, axis X is the moving axis of the strip, preferably a horizontal axis. Axis Z is the orthogonal axis in relation to the plane in which the strip moves, preferably the vertical axis. Axis Y corresponds to the axis around which support 1 is rotatably mounted, preferably an axis that is orthogonal and horizontal in relation to the moving axis of the sealing strip. The longitudinal axis of the sealing strip is labeled A3.

When reference is made to a direction of displacement according to a given direction, this may be in one direction and/or the other, according to that direction.

In order to obtain these displacement mobilities, the machine may include a mandrel displacement system to which the support is attached, which includes a first mounted motorized cart (not shown) sliding on axis X, and a second mounted motorized cart (not shown) sliding on axis Z. A third mounted motorized cart on axis Y may be provided.

The displacement system also has a rotating motor around axis A1 to rotate mandrel 10. As recalled above, it can also be provided that the displacement system be carried out in the form of a multi-axis robot.

In the example shown in the figures, object 22 shows an area 20, such as an opening slot, intended to be covered by a sealing strip 3 to ensure that the object is leak-proof at that slot.

The machine includes a feeding system that allows sealing strip 3 to be brought between a sonotrode 5 (shown below) and a sealing area of the object. The feeding system may include a strip support, which is in the form of a reel receiving the roll strip, and a rotating roller 4. The rotating roller is a roller rotating on itself using an engine. The rotating roller is used to wind and unwind the part of the sealing strip that rests on the roller.

The rotation of roller 4 (shown in FIG. 12) allows sealing strip 3 to be brought between object 22 and a sonotrode 5.

Sonotrode 5 includes an ultrasonic generator and a body that is subjected to this ultrasound to restore this vibratory energy to sealing strip 3 to be applied on object 22 in order to excite the adhesive of sealing strip 3 and to make it adhesive, so as to allow adhering sealing strip 3 applied to object 22.

In particular, sonotrode 5 has an application area 51 intended to come into contact with sealing strip 3. Application area 51 can be located on a shaped tip, in a material that conducts ultrasound, applied to the main body of the sonotrode.

Figure 8:
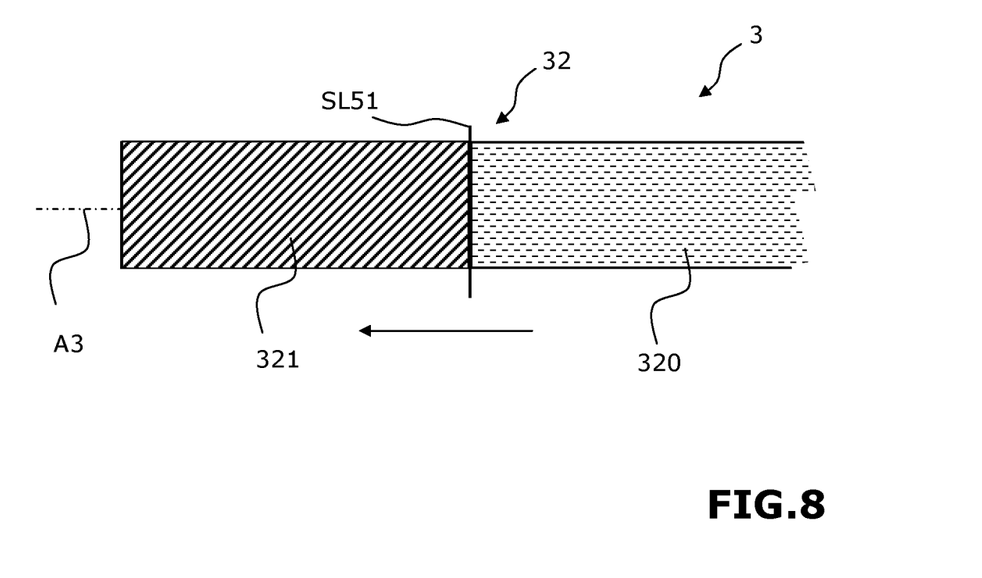
FIG. 8 is a schematic view of a sealing strip, the right part not yet required by the sonotrode being represented differently from the left part of the strip, which was required by the sonotrode, and which, thus, adheres to the object (not shown)

As illustrated in FIG. 8 for a portion of the sealing strip, sealing strip 3 includes an adhesive face 320 that becomes active (i.e. adhesive), when subjected to the ultrasound of sonotrode 5. Hatched area 321, located downstream of the sonotrode application area presented in the form of a line segment SL51, illustrates the portion of the strip whose adhesive was activated as a result of its continuous running against the application area of the sonotrode. The side of the strip provided with an adhesive is intended to be positioned next to the part of the object to be sealed.

Preferentially, sealing strip 3 is a peelable strip. When the strip has been affixed, it can be removed by pulling it to peel it off. "Peelable" means that the strip will not tear when it is pulled off, while the adhesive remains on the areas of the previously sealed shells. According to an embodiment, the strip can be, for example, made of a synthetic, non-woven, polyethylene fiber material, usually sold under the registered brand name TYVEK.

In the active state of the sonotrode, application area 51 of the sonotrode which is in contact with a corresponding area of the sealing strip, ultrasonically excites the adhesive present on sealing strip 3 on the side of object 22, so as to melt the adhesive (which activates it) and to adhere the area of the excited sealing strip on the object.

According to the embodiment shown in the figures, application area 51 of sonotrode 5 is linear. The term "linear" is used as opposed to "areal." For example, the end portion of sonotrode 5 presents a curved profile, such as a semi-circular shape, whose top generator forms a line segment that corresponds to segment SL51 of the sonotrode (see FIG. 8) applied to the sealing strip when the sealing strip runs between sonotrode 5 and object 22.

In the example shown in the figures, direction A51 of the line segment defined by linear application area 51 of the sonotrode, is substantially parallel to the axis A1 (direction Y) of rotation of support 1.

The machine comprises a controlling unit 100 which allows the control of the movements of support 1 (in particular the movements of the carts) especially in the plane X, Z, and possibly on the axis Y, and to control the rotation of support 1 via the motor to which the support is coupled, and to control the feeding system of the sealing strip, for example, by steering the rotation of roller 4. It can also be provided that controlling unit 100 allows the power supply of sonotrode 5 to be controlled to activate it at the beginning of the sealing operation and to deactivate it at the end of the sealing. Controlling unit 100 can also control the operation of a cutting system (not shown) of the sealing strip at the end of the sealing operation.

During the sealing operation, controlling unit 100 is configured to control the displacement of support 1. The controlling unit can also control the pressure of sonotrode 5 on the part of sealing strip 3 to be applied to object 22 using a cylinder (controlled by the controlling unit) allowing the sonotrode to move according to the axis Z.

Figure 12:
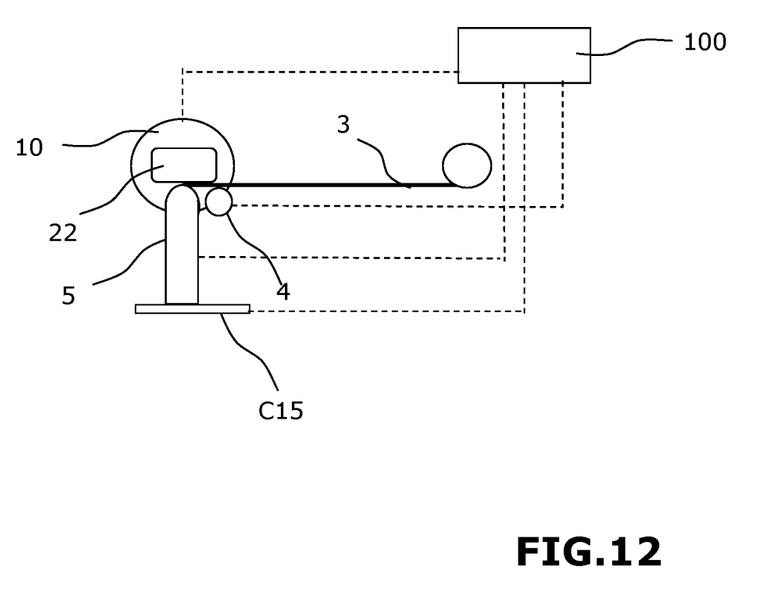
FIG. 12 is a view of the lid of a machine according to an embodiment of the invention.

A sensor C15, shown in FIG. 12, connected to controlling unit 100, allows determining the support or pressing effort or force between support 1 (or object 22) and sonotrode 5, and to control the displacement of support 1 and/or sonotrode 5, especially on the axis Z, to maintain a support reference value in order to have a homogeneous support effort during the sealing operation so as to obtain good application conditions of the sealing strip on the object. Sensor C15 may be associated with sonotrode 5 to detect the support or pressing effort or force exerted between support 1 and the sonotrode. Sensor C15 can be an effort or force gauge.

In the activated state, sonotrode 5, using ultrasound, excites the substance, or adhesive, present on the sealing strip, which melts it and causes the adhesion of the excited part of the strip on object 22. The movement of the support, in particular the rotation of support 1 of the object, then causes the sealing strip to run between sonotrode 5 and object 22. Part 32 of sealing strip 3, which is present between object 22 and sonotrode 5, is thus applied continuously to the sealing area of object 22.

According to one particular aspect, once the adhesion is initiated on a part of sealing strip 3, sealing strip 3 is released as support 1 moves and pulls on the sealing strip, for example, because of the winding of the sealing strip on the support.

Controlling unit 100 allows controlling the rotating displacement of support 1, and therefore of object 22 carried by support 1, in combination with or independently of the displacement of support 1 according to the direction X or Z, and optionally Y. The controlling unit controls the rotation around axis Y, and/or in the plane X, Z, and possibly according to Y, depending on the geometric profile of the sealing area. It is thus understood that, during the sealing step, the displacement of support 1 can be a translational displacement to apply the strip on a straight portion of the sealing area or a rotation, possibly combined with a translational movement, to apply the strip to a curvilinear portion of the object. As recalled above, the controlled displacement can also take into account the reference effort to be applied at the level of the contact area between sonotrode 5 and sealing strip 3.

It may be anticipated that controlling unit 100 includes a user interface for entering or selecting data corresponding to the profile (i.e. the geometric shape) of the sealing area of the object, to allow controlling unit 100 to control the displacement system of support 1 so that the sealing strip is applied continuously and evenly along the sealing area. A memory is used to store the profile or a list of profiles.

According to one particular aspect, controlling unit 100 is configured so that, at the same time that it controls the rotation of the support and therefore the object on itself, around the axis Y, it orders the displacement of the object in the plane X, Z, and possibly on the axis Y, in order to continuously and regularly bring the part of the object corresponding to the area intended to receive the sealing strip in contact with the active segment of the sonotrode through the sealing strip that extends between the sonotrode and the object.

According to an embodiment, it is possible to provide that controlling unit 100 be configured to move support 1 of the object also on the axis Y. Initially to properly position the sonotrode in relation to the slot and/or during the sealing operation, if the position of the sealing area varies according to axis Y during the rotation of the support, i.e. if the shape of the sealing area varies according to axis Y, so that an adaptation of the position of the object (and thus of support 1) is necessary during the sealing operation according to the part of the sealing area of the object present in relation to the sonotrode.

Thanks to active segment SL51 of sonotrode 5 and controlling unit 100, which controls the movement of the support, sealing strip 3 can be applied reliably and efficiently without the risk of irregularity or variation of adhesion at the level of different areas of the sealing strip applied to the object.

In fact, the controlled displacement of the support, combined with the use of a linear active area of the sonotrode, allows the sealing strip to flow continuously between the probe and the object.

The control of the rotation speed of support 1 allows the adhesive present on the face of sealing strip 3 which is opposite to that in contact with active segment SL51 of sonotrode 5, to be sufficiently excited to adhere to the object, and the continuity of displacement (by rotation and/or translational movement of the support) ensures a homogeneous adhesion of the sealing strip to the entire sealing area of the object. Advantageously, and as explained above, the support pressure between the sonotrode and the support is also controlled to promote the homogeneous adhesion of the sealing strip to the object. As recalled above, it can be provided for the machine to include a cylinder allowing to push the sonotrode, directly or indirectly, against the strip with a support pressure of desired value. The support pressure is advantageously regulated by controlling unit 100 to be maintained at a memorized reference value, using sensor 51, which is used to measure the current support pressure.

Active segment SL51 of sonotrode 5 is oriented in a transversal direction, preferably perpendicular, to displacement direction A3 of the part of sealing strip 3 being adhered.

Conversely, the use of a surface sonotrode could lead to discontinuities of quality in the adhesion at the junction level between two zones of the strip corresponding to two zones successively subjected to an active surface of the probe. Indeed, there may be a risk of the partial overlapping of the two excited zones, with the overlapping portion of the two zones having been overly stressed by the sonotrode, which may affect the quality of adhesion or bonding to the object, or, on the contrary, there may be a gap between the two excited zones, this difference corresponding to a non-adhered area on the object (that is to say, non-adherent) which is detrimental to the desired sealing.

In the example shown in the figures, object 22 on which the sealing strip is applied, as detailed below, is an upper shell of a packaging. The packaging thus includes said upper shell and a lower shell 21 intended to be welded to said upper shell. According to an embodiment, lower end part 26 of upper shell 22 is intended to be engaged in lower shell 21. The packaging is preferably intended to contain a medical product or part 7.

Object 22 may thus conform to the upper shell described in the international application published under number WO2018078242A1 and the content of which is incorporated by reference in this application.

According to a particular aspect, the packaging is designed for the purpose of preserving the sterile nature of the product or part, and for unpacking such product or part in aseptic or close-to-aseptic conditions. The object can be, for example, a solid part, such as a surgical screw, or any other type of object, particularly any other type of implant. Moreover, said product can be a liquid or a powder. Said product or piece and, preferably, the various parts of the packaging, are sterilized, for example by radiation.

In the example shown in the figures, upper shell 22 consists of a closing part 24, called a lid, and a connecting part 23, in the form of a crossing body, and connected to lid 24 by joint 25.

Joint 25, which is preferably formed by a continuous zone of material, for example plastic, continues between the lid and the connecting part, allowing lid 24 to be articulated in relation to connecting part 23 between a raised (open) position, allowing access to the interior of the connecting part, and a lowered (closed) position preventing access to the interior of said connecting part. Prior to sealing, the joint is not required, so that the lid is in the "closed" position and the joint area has surface continuity, without folds, with the surrounding areas of the lid and the connecting part. As explained below, according to an embodiment, the sonotrode and the sealing strip are positioned so as to initiate the bonding of the sealing strip out of the slot, on the part of the upper shell that forms the joint.

Figure 9:
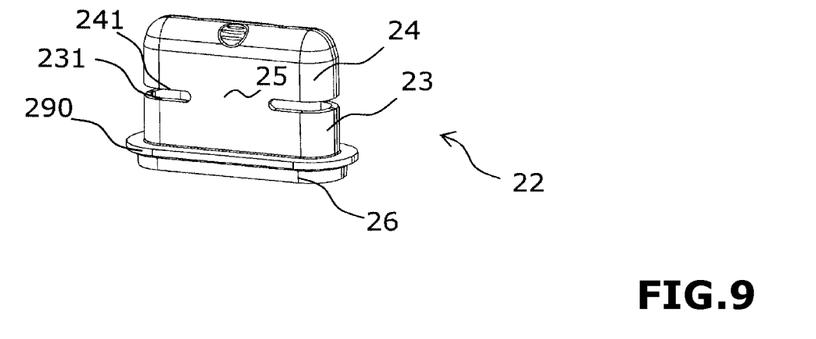
FIG. 9 is a perspective view of a top shell of a packaging, such as the shell in FIG. 1, said upper shell having an opening slot that can be sealed by a sealing strip according to a sealing procedure, in accordance with the embodiment of the invention.
Figure 10:
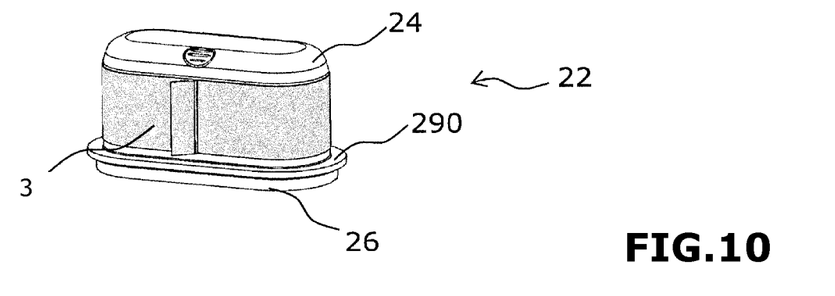
FIG. 10 is a perspective view of the upper shell of FIG. 9 in the applied state of the sealing strip on the opening slot.

In the example shown in FIG. 9, said connecting part 23 is in the form of a section of the upper shell. Connecting part 23 is of a general cylindrical shape, whose peripheral wall develops around the opening axis of said upper shell.

As recalled above, once the sealing process is complete, sealing strip 3 binds, on the outer side of the upper shell, edges 231, 241 of the lid and of the connecting part, which are positioned facing each other when the lid is closed (or lowered), over the entire length of the edges, and from one edge to the other, so as to seal the packaging.

According to an embodiment, the displacement of support 1 of the object is controlled in combination with the activation of sonotrode 5, at least until sealing strip 3 returns on itself by being adhered by sonotrode 5 on a part of sealing strip 3 already adhered to object 22. In other words, sealing strip 3 is applied by one of its ends to joint 25 of the shell, and extends along the slot edges and returns to be applied to the joint.

Thus, in the example illustrated in the figures, sealing strip 3 is affixed by one of its extremities to joint 25, extended along the edges of lid 24 and connecting part 23, which extend face to face with each other, and returns to affix to joint 25. Each edge stops at the joint.

Thus, a very good bacteria and liquid-resistant seal is achieved, with no discontinuity along the opening of the upper shell. On the contrary, an overlap of one end of the strip by itself at the level of a part of the opening area of the packaging may cause a bad seal.

Advantageously, connection part 23 of the upper shell is equipped with a stiffening element 290 removed from the joint. In particular, the peripheral wall of connecting part 23 is fitted with a flange 290, preferably located near the lower edge of the upper shell that delimits the opening of the upper shell. Said connection part 23 of upper shell 22 is intended to be attached to lower shell 21, preferably by welding.

Flange 290 is removed from the opening area of the upper shell delimited between upper circumference 231 of the connecting part and the corresponding perimeter 241 of the lid to allow sealing strip 3 to cover the defined opening area between said circumferences.

Figure 11:
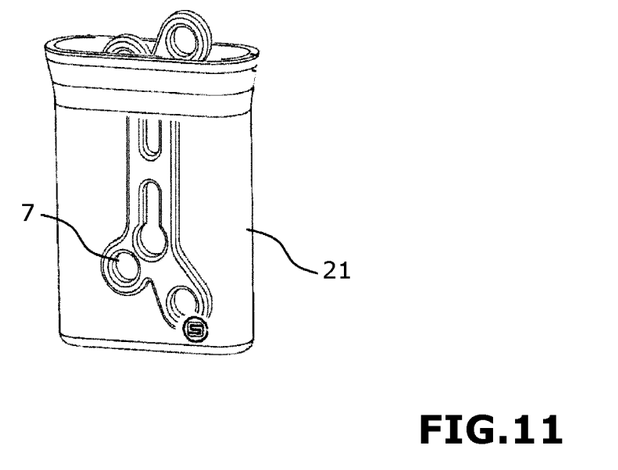
FIG. 11 is a perspective view of a lower shell intended to be welded with the upper shell illustrated in FIG. 10 to form a packaging.

According to an embodiment illustrated in FIG. 11, lower shell 21 is in the form of a hollow body with a closed extremity forming the bottom and an opposite extremity, which is open. Thus, each shell is considered to be an open shell, meaning that it forms a blind cavity and enables a closed chamber to be defined when a sealing strip has been affixed, as detailed below. The open end portion can be flared to accommodate a portion of the upper shell.

In the example shown in the figures, the circumference of the lid is of the same shape and size as the upper edge of the connecting body. Thus, in the closed position of the lid, these circumferences are located in front of each other and together for said upper shell by presenting a closed end and an opposite open end, which, when assembling the upper shell with the lower shell, communicates with the lower shell.

For example, the controlling unit is in the form of a processor and a data memory in which computer instructions executable by the processor are stored, or in the form of a microcontroller.

In particular, the functions and steps described can be implemented in the form of a computer program or via hardware components (e.g., field programmable gate array). In particular, the functions and steps taken by the controlling unit, in particular for the control of the motors of the displacement system, can be carried out by sets of instructions or computer modules implemented in a processor or controller, or be carried out by dedicated electronic components or FPGA [field-programmable gate array] or ASIC [application-specific integrated circuit] type components. It is also possible to combine computer parts and electronic parts.

The controlling unit is thus an electronic and/or computer unit. When it is specified that said unit is configured to perform a given operation, this means that the unit includes computer instructions and the corresponding execution means which enable the operation to be carried out and/or that the unit includes corresponding electronic components.

Figure 1:
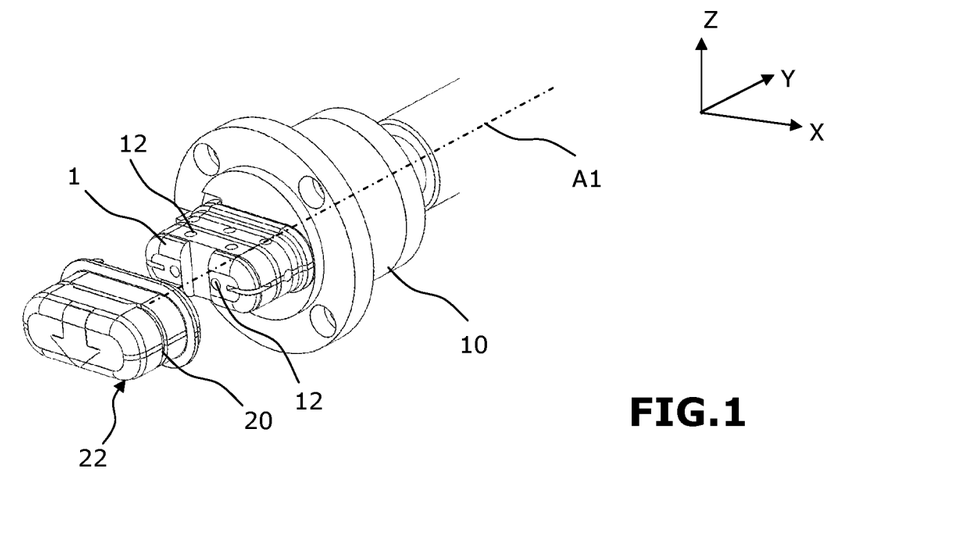
FIG. 1 is a perspective view, according to the embodiment of the invention, of an upper shell of a packaging having a slotted sealing area with a sealing strip and a support for receiving said shell to allow it to be held during the sealing operation.
Figure 2:
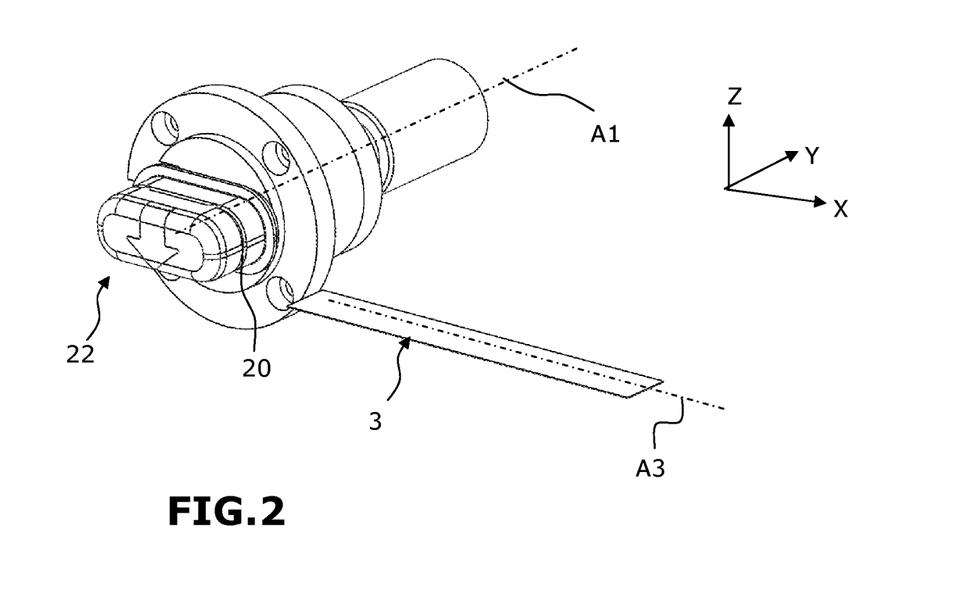
FIG. 2 is a perspective view according to the embodiment of the invention, of the shell and the support of FIG. 1, of the shell being held by said support, and of a sealing strip, of which a part is intended to be applied to the slotted area of the shell.
Figure 3:
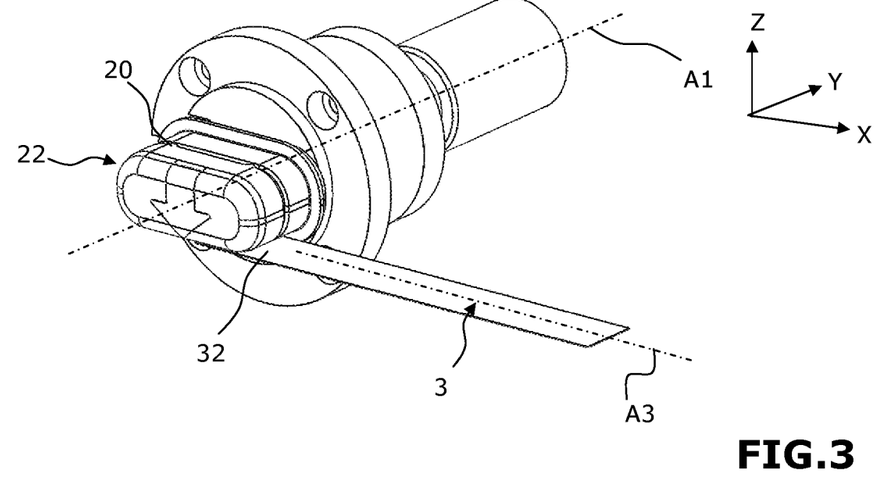
FIG. 3 is a perspective view, according to the embodiment of the invention, of the shell, the support, and the sealing strip of FIG. 2 being held by a part of the sealing strip under the shell for the application of the said part of the sealing strip on the slotted sealing area, and the sonotrode is not shown.
Figure 4:
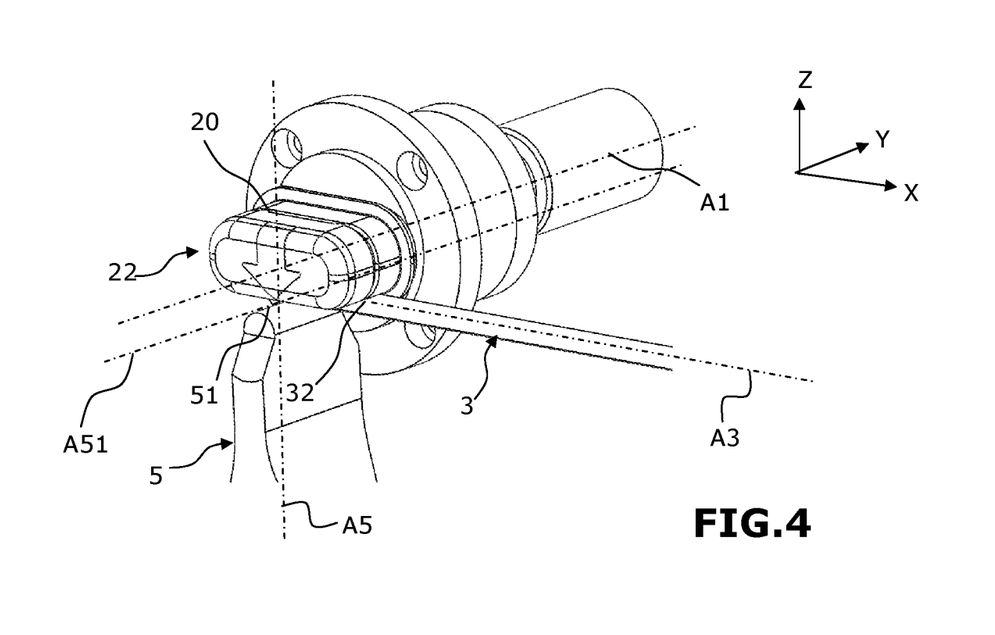
FIG. 4 is a perspective view, according to an embodiment of the invention, showing the part of the sealing strip positioned between the sonotrode and the shell, in order to start the sealing by pre-adhering the sealing strip in a position of the shell corresponding to a part located between the ends of the slot, which forms a joint.
Figure 5:
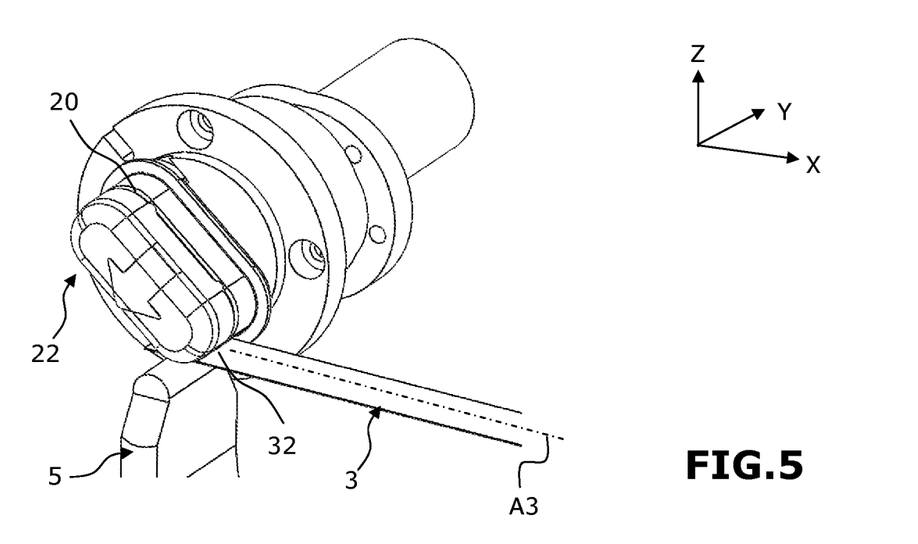
FIG. 5 is a perspective view, according to an embodiment of the invention, of the shell on its support, being rotated on itself, while the sealing strip unwinds and winds, by the displacement movement of the shell, on the shell being adhered to the slotted area of the shell using the sonotrode.
Figure 6:
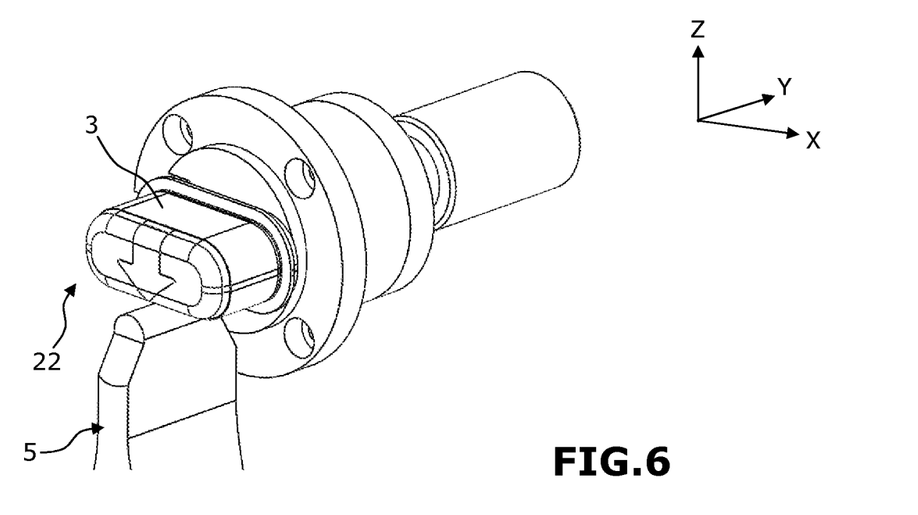
FIG. 6 is a perspective view, according to an embodiment of the invention, of the shell maintained on its support, at the end of the operation of applying the sealing strip onto the shell, the sealing strip being returned to the initial sealing area.
Figure 7:
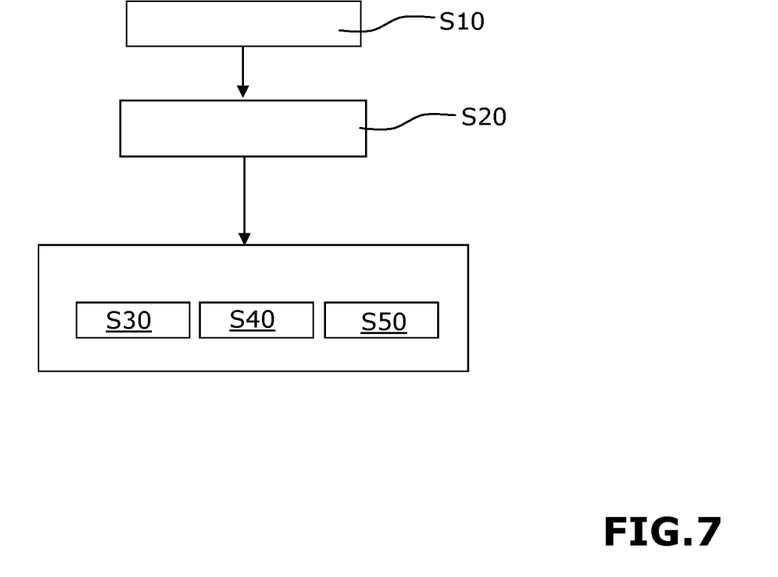
FIG. 7 is a block diagram presenting the different stages of a sealing process according to the embodiment of the invention.

The controlling unit enables controlling the steps of the process, an example of which is schematized in the form of blocks in FIG. 7.

Under this procedure, in step S10, object 22 is coupled to support 1. For this purpose, the controlling unit can activate the holding system, for example, a suction system to maintain object 22 coupled to support 1.

In step S20, controlling unit 100 controls the supply, for example, by rotating the rotating roller 4, and optionally a reel, of sealing strip 3 between object 22 and sonotrode 5.

Controlling unit 100 then controls the positioning of a part of object 22, e.g. joint 25, in support of line segment SL51 of sonotrode 5 through sealing strip 3.

The activation of sonotrode 5 allows the level of its linear segment SL51 to initialize the adhesion of the sealing strip on the object. While holding object 22 against sonotrode 5, by means of sealing strip 3 which extends between object 22 and sonotrode 5, at a given reference point, thanks to effort sensor C15, controlling unit 100 controls the displacement of the support and, therefore, of object 22 according to the profile of the sealing area, which enables running sealing strip 3 continuously in front of sonotrode 5 and to apply sealing strip 5 continuously on the sealing area which is progressively present in front of sonotrode 5, thanks to the controlled displacement of support 1 (and therefore of object 22 held). The controlled displacement can include a rotation motion S30 of support 1 on itself (around axis Y), a translational movement S40 of support 1 on axis X, and/or a translational movement S50 of support 1 according to axis Z. Once the sealing strip is applied to the sealing area of the object, controlling unit 100 can control the activation of a strip cutting system (not shown). Object 22 can then be removed from the support, for example, after the inactivation of the holding system.

The invention is not limited to the embodiments shown in the drawings.

In addition, the term "comprising" does not exclude other elements or steps. Moreover, the characteristics or steps that have been described with reference to one of the embodiments described above can also be used in combination with other characteristics or steps in other embodiments described above.

The invention claimed is:

1. A method for sealing an area of an object, said method comprising the following steps:
   providing an object comprising a sealing area along an opening slot intended to be covered by a sealing strip, the sealing strip comprising a material that is adhesive in an excited state when subjected to ultrasound;
   feeding, by means of a rotating roller, the sealing strip between the object and a sonotrode, the sonotrode comprising an application area that is a line segment;
   supporting or pressing the application area of the sonotrode with the sealing strip to thereby adhere a sealing area of the sealing strip, which is in contact with the application area of the sonotrode, to a corresponding sealing area of the object; and
   displacing the object in relation to the sonotrode based, at least in part, on a geometric profile of the sealing area of the object, so as to continuously and evenly apply the sealing strip to the sealing area of the object.

2. The method according to claim 1, wherein displacing the object comprises a rotational movement of the object around a rotation axis.

3. The method according to claim 2, wherein displacing the object comprises displacing the object in a direction transverse to the direction of the rotation axis.

4. The method according to claim 2, wherein displacing the object comprises a displacement of the object in a direction parallel to the direction of the rotation axis.

5. The method according to claim 2, wherein a direction of the line segment defined by the application area of the sonotrode is parallel to the direction of rotation of the object.

6. The method according to claim 1, further comprising transmitting ultrasound from the sonotrode to a portion of the sealing strip between the object and the sonotrode so that said portion of the sealing strip subjected to ultrasound is adhered to the object, and wherein displacing the object causes running of the sealing strip between the sonotrode and the object.

7. The method according to claim 1, wherein support or pressing force of the sonotrode on the object is measured using a sensor, wherein displacement of the object, in relation to the sonotrode, is further controlled based, at least in part, on the measured support or pressing force, so as to promote homogeneous adhesion of the sealing strip to the sealing area of the object.

8. The method according to claim 7, wherein the sensor comprises a force gauge.

9. The method according to claim 1, wherein the sealing strip comprises a side with adhesive which becomes active when subjected to ultrasound from the sonotrode.

10. The method according to claim 1, wherein the object is displaced at least until the sealing strip returns on itself by being adhered by the sonotrode onto a part of the sealing strip already adhered to the object.

11. The method according to claim 1, wherein the process further comprises a step of cutting the sealing strip after covering, by the sealing strip, of the sealing area of the object.

* * * * *